(12) United States Patent
Bean et al.

(10) Patent No.: US 10,858,053 B2
(45) Date of Patent: Dec. 8, 2020

(54) SMART TRAILER SYSTEM

(71) Applicant: PHILLIPS CONNECT TECHNOLOGIES LLC, Santa Fe Springs, CA (US)

(72) Inventors: Adam Bean, Hacienda Heights, CA (US); Timothy Ronald Jackson, Yorba Linda, CA (US); Douglas Chambers, San Pedro, CA (US); Ruben Chicas, San Pedro, CA (US); Robert Alexander Phillips, Laguna Niguel, CA (US); Thomas Begin, Portland, OR (US)

(73) Assignee: Phillips Connect Technologies LLC, Santa Fe Springs, CA (US)

( * ) Notice: Subject to any disclaimer, the term of this patent is extended or adjusted under 35 U.S.C. 154(b) by 490 days.

(21) Appl. No.: 15/728,498

(22) Filed: Oct. 9, 2017

(65) Prior Publication Data

US 2018/0099712 A1 Apr. 12, 2018
US 2019/0111984 A2 Apr. 18, 2019

Related U.S. Application Data

(60) Provisional application No. 62/405,680, filed on Oct. 7, 2016, provisional application No. 62/457,054, filed
(Continued)

(51) Int. Cl.
*B62D 63/08* (2006.01)
*G05B 19/418* (2006.01)
(Continued)

(52) U.S. Cl.
CPC .......... *B62D 63/08* (2013.01); *G01M 17/007* (2013.01); *G05B 19/4185* (2013.01);
(Continued)

(58) Field of Classification Search
CPC ..... B62D 63/08; B62D 53/00; G01M 17/007; G05B 19/4185; H04L 12/2803; H04L 12/4625
(Continued)

(56) References Cited

U.S. PATENT DOCUMENTS 6,970,772 B2 * 11/2005 Radtke .................. H04B 3/548
303/122.06
7,932,815 B2 4/2011 Martinez et al.
(Continued)

FOREIGN PATENT DOCUMENTS

TW 200524768 A 8/2005
WO WO 01/51326 A1 7/2001

OTHER PUBLICATIONS

Taiwanese Office action for Application No. 107112149, dated Aug. 2, 2019, 11 pages.
(Continued)

*Primary Examiner* — John A Tweel, Jr.
(74) *Attorney, Agent, or Firm* — Lewis Roca Rothgerber Christie LLP

(57) ABSTRACT

A smart trailer system coupled to a trailer of a vehicle includes a sensor configured to measure a parameter of the trailer, a sensor interface board electrically coupled to the sensor and configured to retrieve the measured parameter, and a master controller communicatively coupled to the sensor interface board via a data bus.

21 Claims, 9 Drawing Sheets

Related U.S. Application Data on Feb. 9, 2017, provisional application No. 62/464,378, filed on Feb. 28, 2017.

(51) Int. Cl.

| | |
|---|---|
| *H04L 12/46* | (2006.01) |
| *H04L 12/28* | (2006.01) |
| *G01M 17/007* | (2006.01) |
| *G07C 5/00* | (2006.01) |
| *B62D 53/00* | (2006.01) |
| *H04W 84/04* | (2009.01) |

(52) U.S. Cl.
CPC ...... *H04L 12/2803* (2013.01); *H04L 12/4625* (2013.01); *B62D 53/00* (2013.01); *G07C 5/008* (2013.01); *H04W 84/042* (2013.01); *Y02P 90/18* (2015.11)

(58) Field of Classification Search
USPC .......................................... 340/431
See application file for complete search history.

(56) References Cited

U.S. PATENT DOCUMENTS

| | | | |
|---|---|---|---|
| 8,179,238 B2* | 5/2012 | Roberts, Sr. ............ | G06F 17/00 340/431 |
| 9,499,109 B2 | 11/2016 | Armacost et al. | |
| 9,834,133 B2* | 12/2017 | Bean .................... | B60Q 1/0088 |
| 2004/0224630 A1 | 11/2004 | MacFarland | |
| 2005/0073433 A1* | 4/2005 | Gunderson ........... | G01S 13/931 340/903 |
| 2007/0038346 A1 | 2/2007 | Ehrlich et al. | |
| 2014/0081544 A1 | 3/2014 | Fry | |
| 2015/0137961 A1* | 5/2015 | Bean .................... | G01R 31/007 340/431 |

OTHER PUBLICATIONS

International Search Report and Written Opinion for Application No. PCT/US2017/055810, dated Jan. 25, 2018, 9 pages.

* cited by examiner

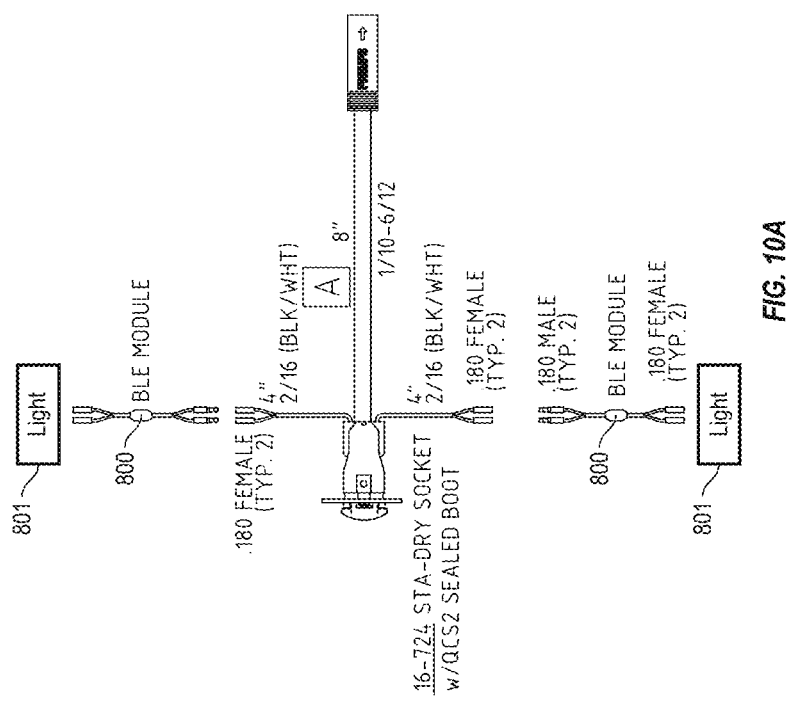

SMART TRAILER SYSTEM

CROSS-REFERENCE TO RELATED APPLICATION(S)

This application claims priority to, and the benefit of, U.S. Provisional Application No. 62/405,680 ("SMART TRAILER"), filed on Oct. 7, 2016; U.S. Provisional Application No. 62/457,054 ("POWER DISTRIBUTING SYSTEM"), filed on Feb. 9, 2017; and U.S. Provisional Application No. 62/464,378 ("SMART TRAILER FEATURING A PLUG-AND-PLAY SENSORY NETWORK AND AN ANTI-THEFT SYSTEM"), filed on Feb. 28, 2017, the entire contents of which are incorporated herein by reference.

FIELD

The present invention relates to the field of control and security systems for trucks, trailers, and other motor vehicles.

BACKGROUND

Recently, companies in the heavy-duty trucking industry have introduced new technology to improve the operation of the trailer; however, these systems are typically limited to a few features and considered "closed systems" in that they do not easily integrate into existing fleet management systems. Closed telematics platforms developed for the commercial vehicle market by large component manufacturers have led to multiple systems being deployed on a truck and trailer. These systems are often expensive, inflexible, and allow for limited functionality to address the multitude of priorities that define the focus of today's commercial vehicle fleet managers. In most cases these systems also require additional cabling between the tractor and trailer, thereby leading to compatibility issues and higher costs.

It is commonplace today for a tractor-trailer unit to have three or more telematics packages that require different telecommunication data plans. The data provided by these closed systems are rigid and are often packaged in complex visual displays that place the driver in a position of information overload. Fleet coordinators are challenged with managing multiple inputs from numerous systems with no continuity among internet of things (IoT) platforms.

For those fleet managers who have not adopted commercial vehicle telematics technology at all, the resulting incidents of costly unscheduled maintenance and roadside repairs, cargo theft, driver endangerment, and logistics mishaps continue to mount.

The above information disclosed in this Background section is only for enhancement of understanding of the background of the invention and therefore may contain information that does not form the prior art that is already known to a person of ordinary skill in the art.

SUMMARY

Aspects of embodiments of the present invention are directed to an open telematics solution that provides universal connectivity to multiple commercial vehicle (CV) manufactured components and has integrated additional proprietary trailer security features into a single system platform. The smart trailer system utilizes a single cellular data telecommunications plan and provides flexibility in the implementation of desired features and functions by the fleet manager and their drivers.

According to some embodiments of the present invention, there is provided a smart trailer system coupled to a trailer of a vehicle, the smart trailer system including a sensor configured to measure a parameter of the trailer, a sensor interface board electrically coupled to the sensor and configured to retrieve the measured parameter, and a master controller communicatively coupled to the sensor interface board via a data bus.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be illustrative only.

FIGS. 10A, 10B, and 10C illustrate several connector configurations of the smart wireless sensor module, according to some exemplary embodiments of the present invention.

DETAILED DESCRIPTION

The detailed description set forth below in connection with the appended drawings is intended as a description of illustrative embodiments of a smart trailer in accordance with the present invention, and is not intended to represent the only forms in which the present invention may be implemented or utilized. The description sets forth the features of the present invention in connection with the illustrated embodiments. It is to be understood, however, that the same or equivalent functions and structures may be accomplished by different embodiments that are also intended to be encompassed within the spirit and scope of the present invention. As denoted elsewhere herein, like element numbers are intended to indicate like elements or features.

Aspects of embodiments of the present invention are directed to an open telematics solution that provides universal connectivity to multiple commercial vehicle (CV) manufactured components and has integrated additional proprietary trailer security features into a single system platform. The smart trailer system utilizes a single cellular data telecommunications plan and provides flexibility in the implementation of desired features and functions by the fleet manager and their drivers.

According to some embodiments, in the smart trailer system, the trailer sensory data is transmitted to the cloud and made available to fleet managers and logistics coordinators, who have ultimate control to respond to prompts and schedule parts replacement in the context of improving fleet utilization and reducing overall operating costs. The global positioning system (GPS) and security features of the system allow for cargo protection, driver safety, and precise logistics fulfillment.

In some embodiments, the smart trailer system utilizes the existing tractor connections to provide telematics functionality, to provide an open plug-and-play system that allows for easy integration of components and sensors from various vendors and component manufacturers, to provide a simple interface to existing fleet management systems, to provide a full turn-key system for fleets without an existing management system, and to provide comprehensive security and maintenance information to the fleet manager and vehicle operator (e.g., driver).

Figure 1:
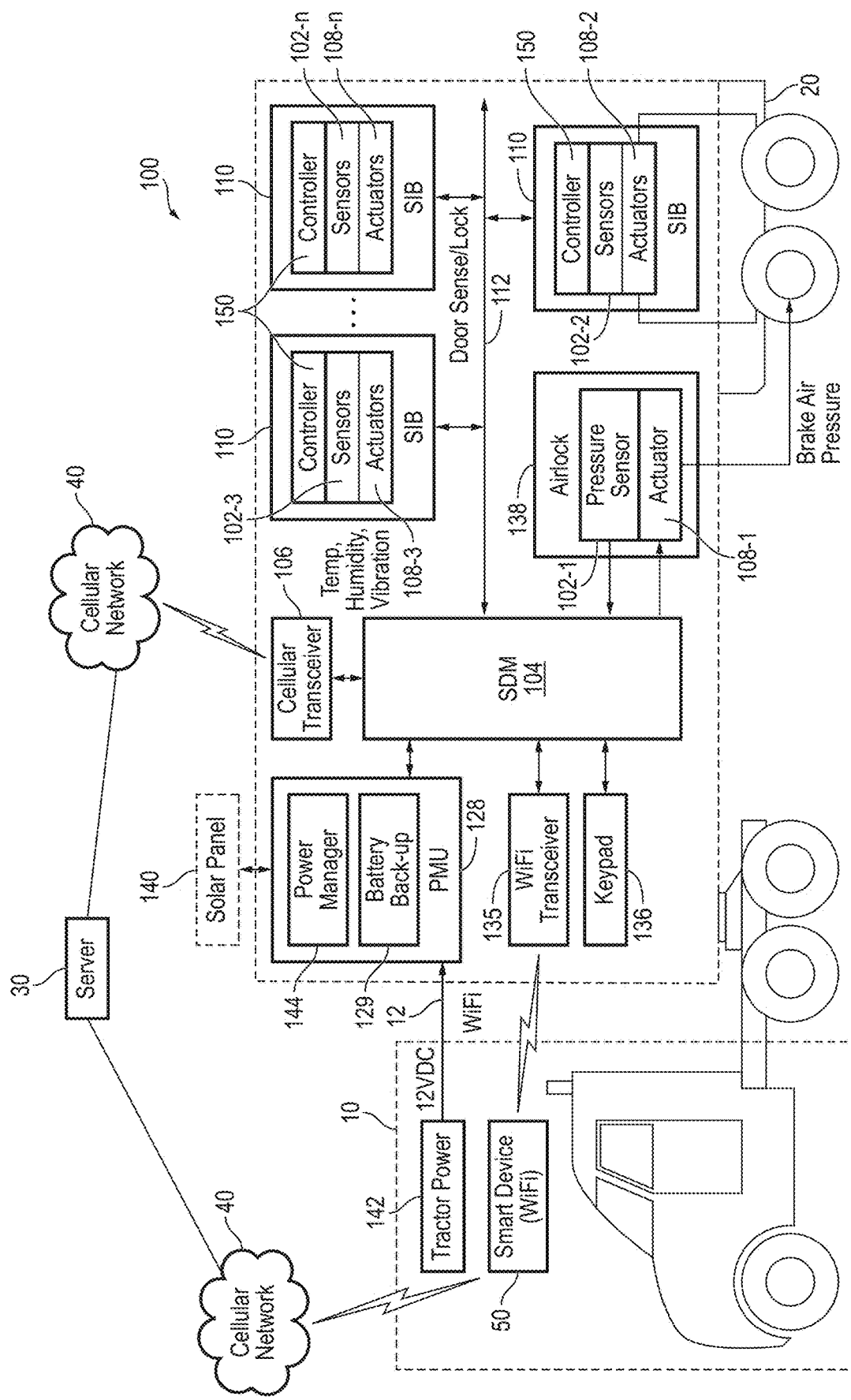
FIG. 1 is a block diagram of a commercial vehicle including the smart trailer system (STS), according to some exemplary embodiments of the invention.

FIG. 1 is a block diagram of a commercial vehicle including the smart trailer system 100, according to some exemplary embodiments of the invention.

Referring to FIG. 1, the commercial vehicle includes a tractor 10 and a trailer 20, which houses the smart trailer system (STS) 100. The STS 100 includes a sensor network 101, which may include a plurality of sensors 102-1, 102-2, ..., 102-n, and a master controller (e.g., a gateway or a sensor distribution module (SDM)) 104 for managing the sensor network 101. In some embodiments, the sensor network 101 is installed in the trailer 20; however, embodiments of the present invention are not limited thereto, and in some examples, some of the sensors in the sensor network 101 may be installed in the tractor 10. The STS 100 further includes a wireless communication module (e.g., a cellular modem/transceiver 106 and/or a wireless transceiver 135) for transmitting the sensor network data to a fleet monitoring server (also referred to as a fleet managing server) 30 that manages the associated trailer fleet, over a communications network (e.g., a cellular network) 40, for further processing and analysis. The server 30 may manage the data generated by the sensor network 101. One or more user devices 50 may be utilized to view and analyze the sensor network data. The STS 100 may provide trailer security, diagnostics, environmental monitoring, cargo analysis, predictive maintenance monitoring, telemetry data, and/or the like.

Figure 2:
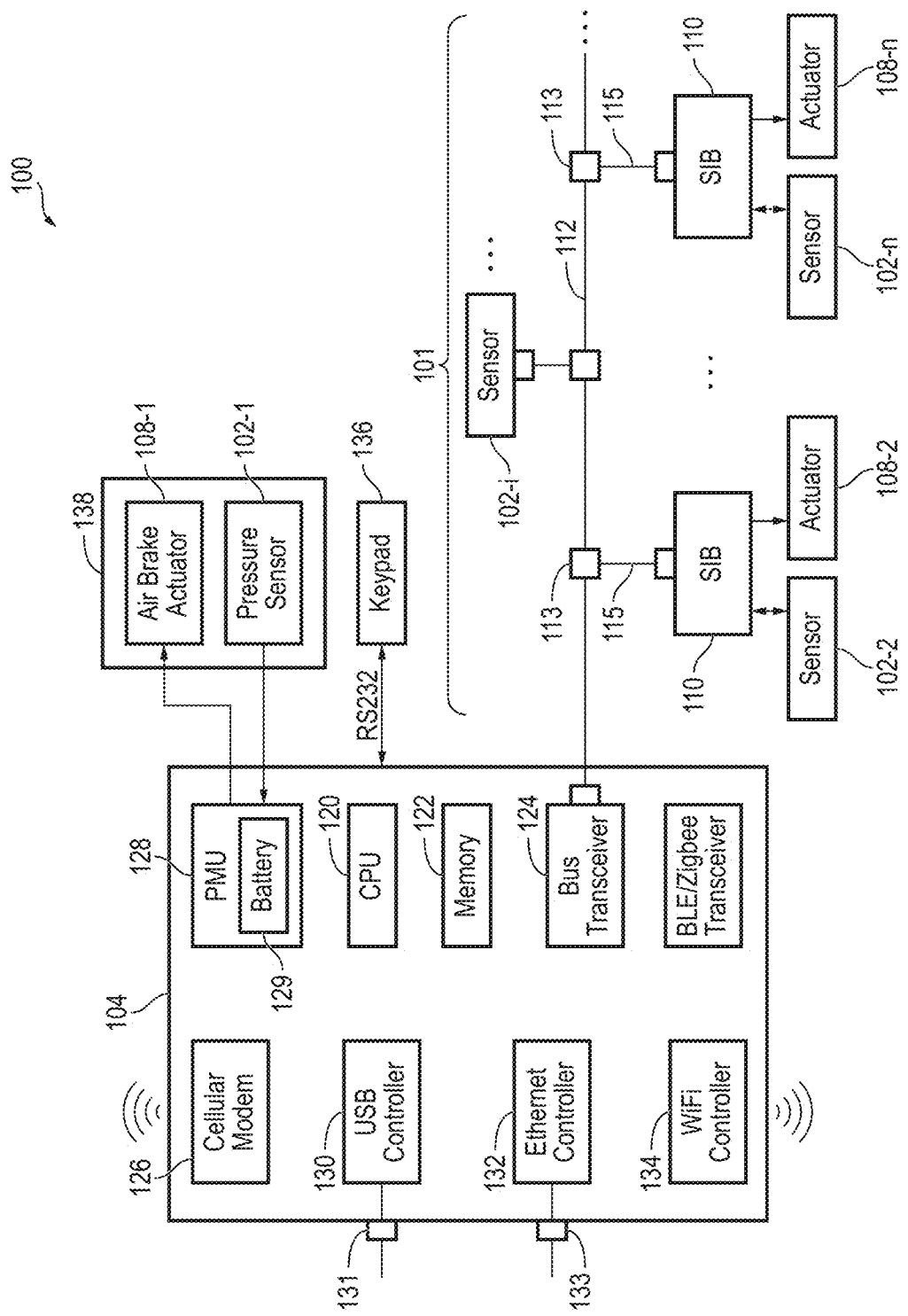
FIG. 2 is a block diagram of a trailer sensor network in communication with the master controller, according to some exemplary embodiments of the present invention.

FIG. 2 is a block diagram of a trailer sensor network 101 in communication with the master controller 104, according to some exemplary embodiments of the present invention.

According to some embodiments, the master controller 104 serves as the gateway that manages the network 101 and all communications to and from the fleet monitoring server 30. In some embodiments, a plurality of sensor interface boards (SIBs) 110 are communicatively coupled to the master controller 104 via a data bus (e.g., a serial controller area (CAN) bus) 112. Each SIB 110 monitors and controls one or more local sensors and actuators installed at various locations within the trailer 20. The sensors 102 of the STS 100 may be coupled to the master controller 104 via a SIB 110 on the data bus 112 (e.g., as is the case with the sensors 102-1 to 102-n of FIG. 2) or directly via a bus interface adapter (e.g., a CAN bus interface adapter, as is the case with sensor 102-i of FIG. 2).

While, in FIG. 2, every SIB 110 is illustrated as being connected to a sensor 102 and an actuator 108 (e.g., 108-1, 108-2 ... 108-n), embodiments of the present invention are not limited thereto. For example, each SIB 110 may be coupled to one or more sensors 102 and/or one or more actuators 108.

According to some embodiments, the master controller 104 includes an onboard microcontroller (e.g., a central processing unit (CPU)) 120, which manages all functions of the master controller 104 including self-tests and diagnostics; a memory device (e.g., a volatile and/or non-volatile memory) 122 for storing the data collected from the sensors 102 as well as firmware, operational and configuration data of the master controller 104; a bus transceiver 124 for interfacing with the SIBs 110 and any directly connected sensors 102 via the data bus 112; and a power management unit (PMU) 128 for generating all operating voltages required by the STS 100. While the embodiments of FIG. 2 illustrate the PMU 128 as being part of the master controller 104, embodiments of the invention are not limited thereto. For example, the PMU 128 may be external to the master controller 104 (e.g., as shown in FIG. 1).

In some embodiments, the master controller 104 ensures that the data in the memory 122 is preserved under conditions including loss of power, system reset, and/or the like. In some examples, the memory 122 may have sufficient capacity to store a minimum of two weeks of data locally. Upon receiving a data request from the fleet managing server 30, the microcontroller 120 may retrieve the requested data from the memory 122 and send it to the server 30 via the cellular modem 126 and/or the WiFi transceiver 135. The microcontroller 120 may also delete data from the memory 122 upon receiving a delete data request from the server 30.

The PMU 128 may receive a DC voltage (e.g., a fixed DC voltage) from the tractor 10 (e.g., the tractor power 142 as shown in FIG. 1) via an electrical cable (e.g., a 7-way or 15-way tractor connector), and may utilize it to generate the regulated voltage(s) (e.g., the regulated DC voltage(s)) used by the master controller 104 and the other components in the STS 100. The PMU 128 may include protection circuits for preventing damage to the STS 100 in the event of power surges (e.g., a load dump), overcurrent, overvoltage, reverse battery connection, and/or the like.

In some embodiments, the PMU 128 includes a backup battery 129 for providing power to the STS 100 in the absence of tractor power. For example, when the vehicle is idle (e.g., when the tractor is off), no power may be provided by the tractor 10, and the STS 100 may rely on the backup battery 129 as a source of power. In some examples, the backup battery 129 may have sufficient capacity to power operations of the STS 100 for a minimum of 48 hours without an external power source (e.g., without the tractor power 142) and/or solar panel 140.

In some examples, the PMU 128 may also receive electrical power from auxiliary power sources 140, such as solar panels that may be installed on the trailer 20, an onboard generator, an onboard refrigerator (e.g., refrigerator battery), and/or the like. In the presence of multiple sources of power (e.g., two or more of the backup power 129, auxiliary sources 140, and tractor power 142), the PMU 128 monitors each source and selects which power source to utilize to power the master controller 104 and the STS 100 as a whole. The power management circuit 142 of the PMU 128 may charge the backup battery 129 when the input voltage from the tractor power 142 or the auxiliary sources 140 is above a threshold (e.g., a minimum level), and may disable charging of the backup battery 129 when the input voltage is below the threshold. The auxiliary power sources 140 may extend the operating time of the STS 100 when the tractor 10 is off (e.g., parked and not operational).

According to some embodiments, the PMU 128 provides status information including solar panel voltage, the output voltage (e.g., the 24 VDC output voltage including overvoltage, overcurrent, etc.), battery charge level, battery charge status, battery charge source, battery current draw, present source of system power, and/or the like to the master controller 104. The PMU 128 may generate an alert when any of the above power parameters are outside of normal operating ranges.

In some examples, when tractor power 142 is available (e.g., at the 7-way tractor connector) and the trailer is traveling at a predefined speed (e.g., about 50 MPH), the PMU 128 may perform a discharge test on the backup battery 129, which allows the STS 100 to compare the discharge profile of the backup battery 129 to that of a new battery, and determine an estimate of the remaining battery life.

In some embodiments, the PMU 128 acts as the interface between the microcontroller 120 and the air brake lock system 138 (i.e., the trailer's emergency air brake system). In addition to normal functionality of the air brake lock system 138, the STS 100 is also capable of engaging the air brake lock system 138 for security purposes, such as when an unauthorized tractor connects to the trailer 20 and attempts to move it. Because the air brake lock system 138 is a safety related feature, the STS 100 has safeguards in place to ensure that the emergency brake does not engage while the trailer 20 is in motion. For example, the master controller 104 prevents the air brake lock system 138 from engaging the emergency brake when the trailer 20 is in motion. This may be accomplished with speed data from the cellular modem 126 and/or data from accelerometers in the STS 100. The air brake lock system 138 includes a pressure sensor 102-1, which monitors the brake system air pressure, and an air brake actuator 108-1 for engaging and disengaging the air line to the emergency brake system.

In some embodiments, the master controller 104 includes a cellular modem 126 for providing a wireless communication link between the STS 100 (e.g., the master controller 104) and the fleet monitoring server 30. The cellular modem 126 may be compatible with cellular networks such as 4G and/or LTE networks. The cellular modem 126 may facilitate over-the-air updates of the master controller 104. While the embodiments of FIG. 2 illustrate the cellular modem 126 as being part of the master controller 104, embodiments of the invention are not limited thereto. For example, the cellular modem 126 may be external to the master controller 104 (as, e.g., shown in the FIG. 1).

In some examples, the master controller 104 may also include one or more of a USB controller 130, an Ethernet controller 132, and a WiFi controller 134. The USB and Ethernet controllers 130 and 132 may allow the mater controller 104 to interface with external components via USB and Ethernet ports 131 and 133, respectively. The WiFi controller 134, which includes a wireless transceiver 135, may support communication between authorized users (e.g., a driver or maintenance personnel) and the fleet managing server 30 via the cellular modem 126. The WiFi transceiver 135 may be mounted in a location at the trailer 20 that ensures that communication can be maintained from anywhere within a radius (e.g., 100 feet) of the center of the trailer 20. In some embodiments, the master controller 104 also includes a Bluetooth®/Zigbee® transceiver 127 for communicating with wireless sensor nodes (i.e., those sensors that are not connected to the data bus 112) within the trailer 20. In some examples, an auxiliary wireless transceiver that is independent of the WiFi controller 134 may be mounted to the trailer 20 as part of the STS 100 in order to perform regular self-test of the WiFi system supported by the WiFi controller 134.

In some embodiments, the master controller 104 provides an idle mode, which reduces operating power by suspending operation of all peripherals components (e.g., all sensors and actuators).

In some embodiments, the master controller 104 can enter into sleep mode, which substantially reduces or minimizes operating power by placing each component of the master controller 104 into its lowest power mode.

The firmware of the master controller 104 may be updated wirelessly through the cellular modem 126 (as an over-the-air update) or the WiFi transceiver 134, and/or may be updated via a wired connection through, for example, the USB controller 130 or the Ethernet controller 132.

In some embodiments, the master controller 104 is coupled to an access terminal (e.g., an external keypad/keyboard) 136, which allows authorized users, such as drivers and maintenance personnel, to gain access to the STS 100. For example, by entering an authentication code the master controller 104 may perform the functions associated with the code, such as unlock the trailer door or put the trailer in lockdown mode. The master controller 104 may include an RS-232 transceiver for interfacing with the access terminal 136. The access terminal 136 may be attached to an outside body of the trailer 20.

The STS 100 includes a global positioning system (GPS) receiver for providing location data that can supplement the data aggregated by the sensor network 101. The GPS receiver may be integrated with the master controller 104 or may be a separate unit.

In some embodiments, each time power is first applied to the master controller 104 (e.g., when the operator turns the ignition key or when the STS 100 is activated) or when an external command (e.g., a diagnostic request) is received from the operator/driver or the fleet managing server 30, the master controller 104 performs a self-check or diagnostic operation in which the master controller 104 first checks the status of each of its components (e.g., the PMU, RS-232 interface, Ethernet controller, etc.) and then checks each element (e.g., sensor 102 or SIB 110) attached to the data bus 112. The master controller 104 then may send an alert command to the fleet monitoring server 30 when any component or element has a faulty status. The alert command may include the status data of all elements attached to the data bus 112. The master controller 104 also communicates with the PMU 128 to determine the source of input power as, for example, tractor power 142 or battery backup 129. Once the self-check operation is concluded, the master controller 104 commences normal operation during which the master controller 104 may periodically or continuously receive sensory data from the sensors 102 and send the corresponding data packages to the fleet monitoring server 30 at a set or predetermined rate. In some examples, the rate of information transmission by the master controller 104 may be variable depending on the power state of the STS 100 (e.g., depending in whether the STS 100 is in idle mode, sleep mode, normal operation mode, etc.).

During the course of its operation, the master controller 104 may receive many different types of commands from the fleet managing server 30. Some examples may include a master controller reset command (e.g., an SDM reset), which initiates a reset of the master controller 104; an STS reset command, which initiates a reset of the entire STS 100, including the master controller 104; a self-test command, which initiates the self-test/diagnostic operation of the master controller 104; an STS update command, which is utilized to initiate an update of the STS 100 that may include firmware updates, STS configuration updates, device library updates, and/or the like; a request data command, which is utilized to request data from the SDM and may include configuration data for the master controller 104 and/or the STS 100, status/alert data, sensor measurement data, location and telematics data, and/or the like; a GPS location command, which is utilized to upload present GPS data from the master controller 104; a send data command, which is utilized to send data to the master controller 104; and a security/lock command, which is utilized to remotely set security features including door lock, air brake lock, and/or the like.

Additionally, the master controller 104 may send a variety of commands to the fleet managing server 30 that may include an STS status command, which is utilized to send STS status (e.g., self-test results, operating mode, etc.) to the fleet managing server 30; an alert/fault command, which is utilized to send alerts to the server 30 (e.g., based on the detection of STS faults and/or trailer events that trigger alert settings); SDM data command, which is used to send the measured data aggregated from the sensor network 101; a configuration alert, which is utilized to notify the fleet managing server 30 when STS configuration is modified; and STS access alert, which is utilized to notify the fleet managing server 30 when a user (e.g., a driver or a maintenance operator) attempts to access the STS 100 via WiFi (i.e., through the WiFi transceiver 134) or the keypad 136.

According to some embodiments, the master controller 104 is capable of setting and dynamically adjusting the data rate from each sensor (e.g., the pace at which measurements are made) independent of other sensors (e.g., may do so through the corresponding SIB 110).

Figure 3:
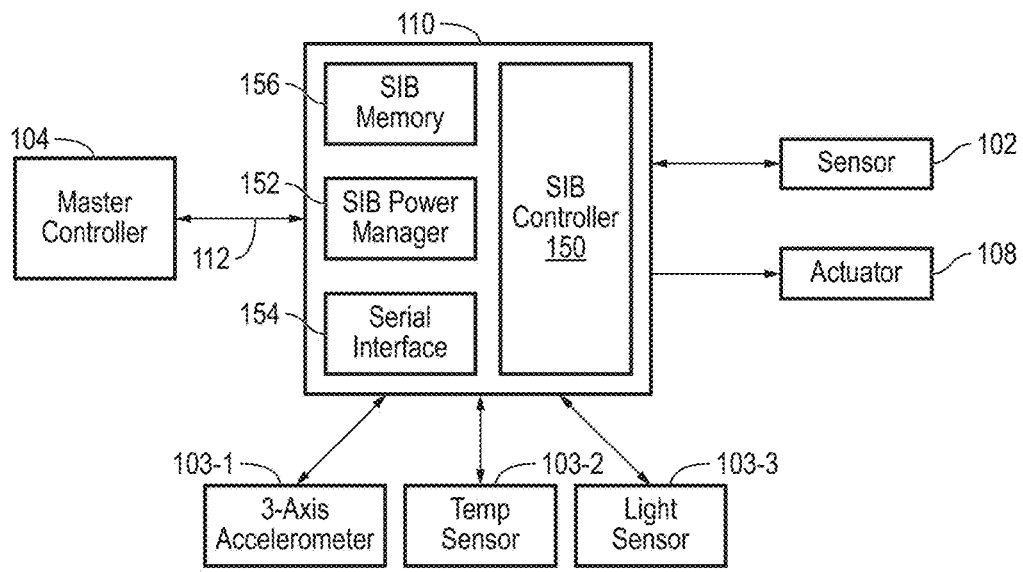
FIG. 3 is a schematic diagram of a sensor interface board (SIB) facilitating communication between the master controller and a sensor, according to some exemplary embodiments of the present invention.

FIG. 3 is a schematic diagram of a SIB 110 facilitating communication between the master controller 104 and a sensor 102, according to some exemplary embodiments of the present invention.

Referring to FIG. 3, each sensor interface board (SIB) 110 manages an assigned set of one or more sensors 102. Some nodes may also manage one or more actuators 108. Each sensor 102 may translate a physical property, such as heat, mechanical motion, force, light, and/or the like, into a corresponding electrical signal. Each actuator 108 is configured to produce an associated mechanical motion when activated (e.g., when an activation voltage is applied to it), and to return to its idle/original position when deactivated (e.g., when the activation voltage is removed).

According to some embodiments, the SIB 110 includes a SIB controller 150 (e.g., a programmable logic unit), a SIB power manager 152, a serial interface 154, and onboard SIB memory 156. The SIB controller 150 is configured to manage the operations of the SIB 110 and to facilitate communication between the master controller 104 and any sensors 102 and/or actuators 108. The SIB power manager 152 includes an onboard power conversion which converts the system voltage received from the master controller 104 into the required operating voltages for the SIB circuitry as well as the voltages utilized by sensor(s) 102 and any actuator(s) 108. The SIB power manager 152 includes protection circuitry, which prevents damage to the SIB 110 in the event that an overvoltage occurs on the system voltage, and/or in the event that the system voltage and ground are reversed at the power input connector of the SIB 110. The serial interface 154 facilitates communication with the master controller 104 via the data bus 112 and supports RS-232 serial data communication with any sensors capable of a CAN bus transceiver for communicating with any RS-232 compatible sensors. The SIB memory 156 may be a non-volatile memory that stores sensor aggregated data as well as reference values for all voltages monitored by the SIB 110.

In some examples, the SIB 110 is also coupled to a 3-axis accelerometer 103-1, a temperature sensor 103-2, and a light sensor 103-3. The sensors 103-1 to 103-3 may be integrated with the SIB 110 or may be external to the SIB 110. The sensors 102 may include, for example, a wheel speed sensor, one or more tire pressure sensors (TPSs), one or more wheel-end and wheel bearing temperature sensors, a smoke detector, a humidity sensor, one or more vibration detectors, an odometer/speedometer, one or more axle hub sensors, one or more brake wear sensors, a position sensor (e.g., a magnetic position sensor), a digital microphone, and/or the like. In some examples, the odometer/speedometer may go on every tire, or may be on a dedicated tire from which this information is taken; and a brake stroke sensor and brake/wheel-end temperature sensors may be on each brake pad/wheel end. Door open detection may be facilitated by a position sensor (e.g., a magnetic position sensor) and/or the like.

According to some embodiments, the SIB 110 (e.g., the SIB controller 150) may be configured to (e.g., programmed to) be compatible with the specifications of the sensor 102 and to operatively integrate with the sensor 102. As such, the SIB 110 translates and packages the sensed data of the sensor 102 in a format that is compatible with the communication protocol of the shared bus and that is also uniform across all sensors 102 (e.g., is compatible with the Modbus serial communication protocol, or any other suitable protocol).

According to some embodiments, the SIB 110 may provide an idle mode that reduces operating power by suspending operation of all peripherals (e.g., all sensors 102/103 and actuators 108). Additionally, the SIB 110 provides a sleep mode which reduces operating power to the minimum achievable level by placing each circuit on the SIB 110 and all peripherals into their lowest power mode. Idle and sleep mode may be activated and deactivated through a command from the master controller 104.

The SIB 110 may prompt the sensors 102/103 to make measurements at a predetermined pace, which is configurable through the master controller 104. Measured data is then stored at the SIB memory 156 for transmission to the master controller 104. In some embodiments, the SIB 110 may enter idle mode in between measurements.

Every time power is applied to the SIB 110, the SIB 110 may perform a self-check or diagnostic routine to determine the status of each of its components (e.g., the SIB controller 150, the SIB memory 156, the serial interface 154, and the sensors 103-1 to 103-3), and report the status of each component to the master controller 104 (e.g., as pass or fail). The master controller 104 may also initiate a self-check routine at any given time via a diagnostic request command. Upon receiving a failed status of any component, the master controller 104 may issue a command to reset the SIB 110, which may prompt a further self-check routine by the SIB 110.

According to some embodiments, the master controller 104 together with the SIB 100 provide a plug-and-play sensory and telemetry system allowing for sensors and/or actuators to be removed from or added to the STS 100 as desired, thus providing an easily (re)configurable system.

According to some embodiments, the shared data bus 112 may include a plurality of conductors for carrying power and data. In some embodiments, a sensory node including a SIB 110 and one or more sensors 102 may branch off of the communication bus 112 using a T-connector or junction box 113, which facilitates the connection of the sensory node to the shared communication bus 112 via a bus extension 115. The bus extension 115 may include the same conductors as the shared communication bus 112, and the T-connector 113 may electrically connect together corresponding conductors of the shared communication bus 112 and the bus extension 115. By connecting any desired sensor 102 to an existing system via a separate T-connector 113 and bus extension 115, the STS 100 may be easily expanded as desired, without requiring a redesign of the entire system.

In some embodiments, the SIB 110 may be encapsulated in a housing that is molded over (e.g., thermally molded over) the SIB 110 and part of the data bus extension and the wire that electrically couples the SIB 110 to the sensor 102. Extending the molding over the wire and the bus extension may aid in protecting the SIB 110 against environmental elements (e.g., may aid in making it waterproof). The housing may include polyurethane, epoxy, and/or any other suitable flexible material (e.g., plastic) or non-flexible material. The housing may provide thermal protection to the SIB 110 and, for example, allow it to operate in environments having temperatures ranging from about −50 to about +100 degrees Celsius.

Figure 4:
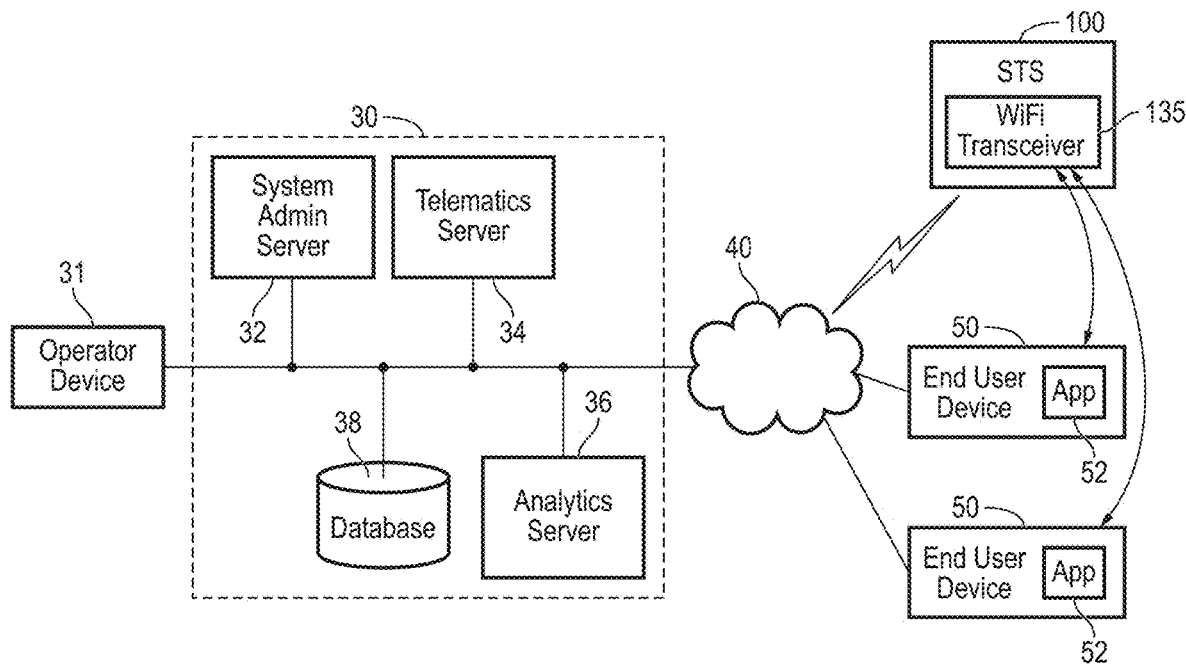
FIG. 4 is a diagram illustrating the fleet managing server in communication with the STS and one or more end user devices, according to some embodiments of the present invention.

FIG. 4 is a diagram illustrating the fleet managing server 30 in communication with the STS 100 and one or more end user devices, according to some embodiments of the present invention.

Referring to FIG. 4, the fleet managing server 30 may be in communication with the STS 100 and one or more end user devices 50. Communications between the fleet managing server 30, the STS 100, and an end user device 50 may traverse a telephone, cellular, and/or data communications network 40. For example, the communications network 40 may include a private or public switched telephone network (PSTN), local area network (LAN), private wide area network (WAN), and/or public wide area network such as, for example, the Internet. The communications network 40 may also include a wireless carrier network including a code division multiple access (CDMA) network, global system for mobile communications (GSM) network, or any wireless network/technology conventional in the art, including but not limited to 3G, 4G, LTE, and the like. In some examples, the user device 50 may be communicatively connected to the STS 100 through the communications network 40 (e.g., when the user device 50 has its own 4G/LTE connection). In some examples, the user device 50 may communicate with the STS 100 and the fleet managing server 30 through the WiFi network created by the wireless transceiver 134 of the STS 100, when within WiFi range.

The fleet managing server 30 aggregates a variety of telematics and diagnostics information relating to each specific trailer in the fleet and allows for the display of such information on an end user device 50 or an operator device 31 through a web portal. The web portal of the fleet managing server 30 may allow the operator to administer the system by designating authorized personnel who may access and use the STS 100, as well as drivers and maintenance personnel who are authorized to move and/or maintain the trailers in the fleet.

According to some embodiments, the fleet managing server 30 provides, through its web portal, a comprehensive fleet management system by integrating system administration tools, telematics information, and trailer status information. This combination of information is integrated into an intuitive user interface that allows the operator to effectively manage the fleet. The web portal may provide a set of screens/displays that allow the operator to easily view summary information relating to the fleet of assets being managed. The web portal may also provide a set of screens/displays which allow the operator to view lower levels of detail related to various elements of the fleet. Such information may be presented in a pop-up, overlay, new screen, etc.

According to some embodiments, the fleet managing server 30 includes a system administration server 32, a telematics server 34, an analytics server 36, and a database 38.

The system administration server 32 may provide system administration tools that allow operators to manage access to the fleet system and set the configurations of the fleet system. Access management allows the operator to create and maintain a database of users who are authorized to access and exercise assigned functions of the system. For example, an individual may be designated as the administrator and have access to all aspects of the web portal, and another individual may be designated as a driver or a maintenance technician and be granted a more restricted and limited access to the features of the web portal. Configuration management allows the operator to set the operating parameters of each asset in the system, either on an individual asset basis or as global settings. According to some embodiments, the system administration server 32 allows an authorized system administrator to select the set of alerts and trailer data that the master controller 104 is allowed to transmit directly to an authorized user, such as the driver or maintenance personnel, via the WiFi transceiver 135; to select the set of controls and features which an authorized user may access locally via the mobile application 52; to select the set of controls and features which the master controller 104 may perform autonomously when the cellular modem 126 does not have a connection to the fleet managing server 30; to set an acceptable geographic boundary for the location of the trailer 20 (also referred to as geo-fencing); and/or the like.

The telematics server 34 may provide location-related information relative to each asset (e.g., each STS 100) in the fleet. The telematics information includes geographic location, speed, route history, and other similar types of information which allow the fleet manager to understand the geographic history of a given asset.

The analytics server 36 may provide trailer status information related to data collected from sensors and systems located on the STS 100 of the trailer itself. This information may provide a dynamic image of the critical systems on a given trailer, such as tire pressure, brakes, cargo temperature, door/lock status, etc. In some examples, the analytics server 36 may analyze sensory and telematics data received from each STS 100 of a fleet and provide a variety of information to the fleet operator, including an organized list of alerts based on severity and category for each STS 100 or the entire fleet; a percentage of the fleet that is in use; a percentage of the fleet that is scheduled for, or is in, maintenance; historical maintenance statistics; a visual map of the locations of each trailer in the fleet; the configuration and status of each trailer; the speed and/or destination of each trailer; and information on each of the drivers, technicians, operators, and the like. Driver information may include the driver's identification number, most current assignment, a list of all events of excessive speed, a list of all events of excessive G-force due to braking or high-speed turning, a list of all excessive ABS events, and the like. Trailer status and configuration may include information such as odometer reading, a list of all components installed on a trailer and the status thereof, pressure of each tire, brake status, ABS fault, light out (faulty light) status, axle sensory information, preventive maintenance summary, present speed and location, self-test/diagnostic parameters, pace of sensor measurements, available memory capacity, date of last firmware update, history of data communications, battery capacity, all parameters related to power management (e.g., voltages, currents, power alerts, etc.), and/or the like.

The data generated by and consumed by each of the servers 32, 34, and 36 may be respectively stored in and retrieved from the database 38.

The fleet managing server 30 may also allow control over various aspects of an STS 100. For example, upon invocation by an operator, the fleet managing server 30 may send a command signal to the STS 100 to initiate a self-test by the master controller 104, initiate capture and transmission of all sensor data, activation or release of door locks, activation or release of the air lock, and/or the like.

The analytics server 36 may also issue a number of alerts, based on the analyzed data, which may be pushed to the operator device 31. For example, such alerts may include a break-in alert, when the proximity detector mounted on the door indicates a door-open status; unauthorized tractor alert, when the STS 100 detects airline and/or 7-way connector connections and a proper authorization code is not received via WiFi 135 and/or the local keypad 136; stolen trailer alert, when the air lock is engaged and the sensors detect trailer motion; brake tamper alert, when the air lock is bypassed or the cable to the air lock from the master controller 104 is cut; tire pressure alert, when a tire pressure is outside of the specified range; brake lining alert, when the brake sensor indicates that a brake lining is outside of the specified range; hub fault alert, when the hub sensor indicates that hub conditions are outside of the specified range; SIB fault self-test alert, when a self-test is run on a SIB 110 and the results indicate a fault; sensor fault alert, when a self-test is run on a sensor and the results indicate a fault; data bus fault self-test alert, when a self-test is run on the sensor data and the results indicate a data bus fault; master controller fault self-test alert, when a self-test is run on the master controller 104 and the results indicate a fault; WiFi fault alert, when a self-test of the WiFi controller is run and the results indicate a fault (if the optional auxiliary WiFi transceiver is installed); excessive speed alert, when the vehicle speed is above the legal speed limit by a pre-determined percentage; hazardous driving alert, when the G-force of the trailer is above a specified level (e.g., from cornering too fast, stopping too fast, accelerating too fast, etc.); and/or the like. In some examples, the alerts may include information suggesting the root cause of any detected failures.

According to some embodiments, the mobile application 52 on the end user device 50 allows the user to enter an authentication code to log in to the STS 100 system (e.g., upon verification by, and permission from, the system administration server 32).

Configuration of the mobile app 52 on a given device 50 may be based upon the authenticated user's access level (e.g., a truck driver may have access to one set of features, while an installation/maintenance person may have access to a different set of features). The mobile app 52 may be capable of providing access to historical data stored in the STS local memory 152, allowing authorized users to run a scan of all elements in the STS 100 and to run diagnostics on the STS 100 (i.e., run a self-check diagnostic routine), displaying an alert (visual and auditory) when an alert is received from the STS 100 (the alert may be routed through the analytics server 36 or be directly received from the STS 100).

Figure 5:
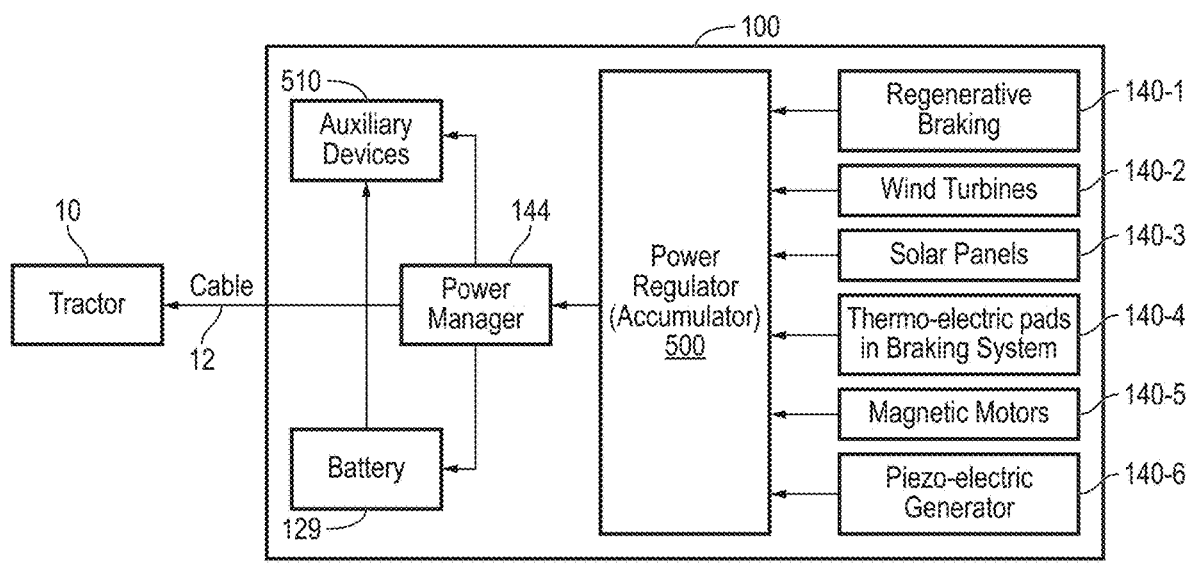
FIG. 5 is a block diagram illustrating the power distribution feature of the STS, according to some exemplary embodiments of the present invention.

FIG. 5 is a block diagram illustrating the power distribution feature of the STS 100, according to some exemplary embodiments of the present invention.

According to some embodiments, the STS 100 (e.g., the power manager 144) harnesses electrical power received from a multitude of auxiliary sources to power the STS 100 and all associated electronic devices, to charge the backup battery 129 at the trailer 20 of a vehicle, and to direct any excess power to the tractor 10 of the vehicle via a dedicated cable 12.

In some embodiments, the STS 100 includes a power regulator (e.g., a power accumulator) 500 that receives power from a plurality of auxiliary power sources 140 and regulates the incoming power to comply with the requirements of the battery 129, auxiliary devices (e.g., external devices) 510 at the vehicle (e.g., a refrigerator, etc.), and the trailer 20. The power manager 144 then manages the distribution of the electrical power accumulated by the power regulator 500. The plurality of auxiliary power sources 140 may include, for example, regenerative brakes 140-1; one or more wind turbines 140-2 that may be installed at side pockets of the trailer 20 (e.g., at the external walls of the trailer 20), which capture wind energy; solar panels 140-3 that may be installed on the roof of the trailer 20; thermoelectric pads 140-4 installed throughout the braking system of the vehicle (e.g., at the trailer 20), which convert thermal energy released through braking action to electrical power; magnetic motors 140-5; piezoelectric generators 140-6; and/or the like. However, embodiments of the present invention are not limited thereto, and may include any other suitable power source.

In some embodiments, the power regulator 500 and the associated auxiliary power sources 140 may be located at and integrated with the trailer 20.

According to some embodiments, the power regulator 500 includes buck/boost regulators that may increase or decrease the input voltage from each of the plurality of auxiliary power sources 140 as desired. For example, the power regulator 500 may operate to produce the same output voltage from each of the auxiliary power sources 140. As a result, the regulated current derived from the power sources 140 may easily be accumulated for distribution by the power manager 144.

The power manager 144 determines how to distribute the regulated power received from the power regulator 500. In some embodiments, the power manager 144 monitors the power usage (e.g., current draw) of each of the auxiliary devices at the trailer 20 (e.g., refrigerator, lighting system, lift motor, ABS brake, and/or the like) to determine the total power consumption of the auxiliary devices. The power regulator 500 then compares the regulated input power from the power manager 144 with the total power consumption of the auxiliary system. When the incoming power is greater than the total power consumption, remaining power may be diverted to the battery 129 at the trailer 20. When the battery 129 is fully charged, excess power may be routed to the tractor 10 via a dedicated power connection 12 (i.e., a dedicated cable having two or more conduction lines, such as the 7-way or 15-way connector) coupling the electrical systems of the tractor 10 and trailer 20. Thus, in effect, the STS 100 may act as an additional power source for the tractor 10, while prioritizing the power needs of the trailer 20 over the tractor 10 in distributing electrical power.

The power regulator 500, the auxiliary power sources 140, and the power manager 144, as well as other components, may form a power distribution system of the STS 100.

In some examples, the tractor 10 may be powered by electric battery cells and/or hydrogen cells. In such examples, the power distribution system may extend the drive range of the vehicle and/or reduce the recharge frequency of the electrical/hydrogen cells. For example, the power distribution system may extend the range of a heavy transport vehicle powered by hydrogen cells from about 1200 miles to about 1500 miles. Thus, the power distribution system may minimize the carbon footprint of the vehicle.

Figure 6:
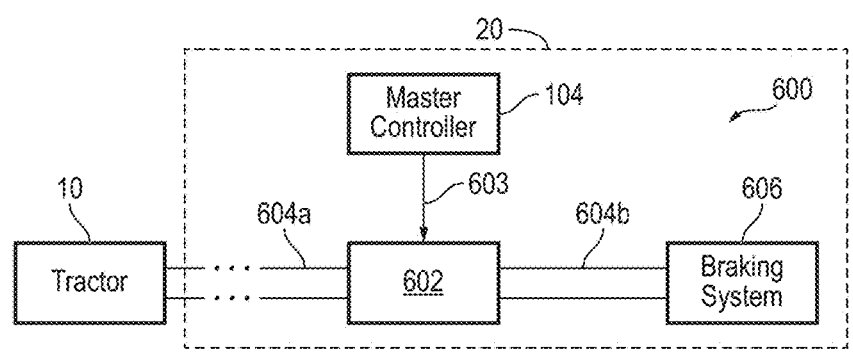
FIG. 6 illustrates the theft protection system of the STS, according to some exemplary embodiments of the invention.
Figure 7:
FIG. 7 illustrates a screenshot of an application running on a user device displaying some of the anti-theft features of the STS, according to some embodiments of the invention.

FIG. 6 illustrates the theft protection system 600 of the STS 100, according to some exemplary embodiments of the invention. FIG. 7 illustrates a screenshot of an application running on a user device 50 displaying some of the anti-theft features of the STS 100, according to some embodiments of the invention.

An important function of the STS 100 is security. According to some embodiments, the STS 100 protects against theft of the trailer 20 by locking out users (e.g., unauthorized users) from being able to tow the trailer 20 without proper credentials. Trailer theft is a serious problem in the industry, and anyone with a tractor may be able to hook up and tow away equipment. For example, a loss of a commercial trailer carrying customer packages may result in a significant loss for the associated company. The theft protection system 600 of the present invention prevents the trailer from accepting electrical power as well as a pneumatic supply, which are instrumental in the ability of towing equipment. A user must verify he/she is authorized to tow the equipment with Bluetooth® credentials (e.g., delivered via a mobile device), security key, RFID proximity detection, FOB access key, fingerprint/iris detection, and/or the like to unlock the trailer 20.

According to some embodiments, the theft protection system 600 of the STS 100 includes the master controller 104 for supplying/shutting off electrical power to the trailer system by activating/deactivating a main switch at the PMU 128 of the trailer 20 (which may reside at the trailer nose box). The main switch may electrically lock the trailer 20 by not only decoupling the electrical systems of the tractor and trailer, but also decoupling all independent power sources at the trailer 20 (e.g., solar panels, a generator, etc.) from the electrical system of the trailer 20.

As shown in FIG. 6, according to some embodiments, the theft protection system 600 further includes a pneumatic valve (e.g., a solenoid valve) 602 located at a position along the air hose 604a/b connecting to the trailer tires to permit or close off air supply to the trailer 20 (e.g., to the trailer braking system 606). The pneumatic valve 602 may activate/deactivate in response to a control signal received from the master controller 104 via a control line 603.

In some examples, the brakes 606 of the trailer 20 may be in a default lock state, in which the brakes 606 are engaged and prevent the trailer 20 from moving when there is an absence of air pressure, and are engaged when proper air pressure is applied to the brakes 606 via the air hose 604b. In the related art, when a trailer is parked away from the tractor, the airline does not receive any airflow from the tractor and the brakes engage automatically. However, an unauthorized tractor may be able to supply the necessary electrical power and air to disengage the brakes and to drive away with the trailer.

According to some embodiments, when the STS 100 is in lock-down mode, the master controller 104 signals the pneumatic valve 602 to shut off airflow to the brakes 606, so that even if airflow is present at the input air hose 604a, no air flow is present at the air hose 604b, which leads to the brakes 606. As such, the brakes 606 will be engaged and motion will be hampered so long as the STS 100 is in lock-down mode. Upon unlocking the trailer 20 (e.g., by an authorized user or system operator), the master controller 104 signals the pneumatic valve 602 to permit airflow through the air hose 604, thus disengaging the brakes 606.

In some embodiments, the pneumatic valve 602 is configured to remain open even when no power is provided to it (i.e., to have a default open state). As such, even if the trailer 20 experiences a complete loss of power, the brakes 606 remain engaged and theft is deterred.

Additional security features of the STS 100 may include door monitoring and remote locking, air pressure monitoring, trailer movement monitoring, and geo-fencing. The STS 100 may include a motorized door lock that may be utilized to remotely lock and/or unlock the trailer door(s). The door lock system may allow for manually disengaging the lock using a special tool, such that it may not be feasible for unauthorized personnel to defeat the lock.

The theft protection system 600 may include a sensor that can detect whether the trailer door is open or closed. The door sensor may provide a linear measurement of the door position from fully closed to open or partially open (e.g., to within a few inches). This feature may also be utilized for detecting wear in the hinges and/or a faulty latching mechanism in the trailer door.

In some embodiments, the ambient light sensor(s) 103-3 of the STS 100 can detect the change in the trailer's interior light level when the trailer door is completely closed versus slightly open. Additionally, the theft protection system 600 of the STS 100 may include audio transducers (microphones) for detecting sounds within the trailer. This may also be utilized to detect when the trailer door is opened, as the sound of the door opening may have a distinct signature that may be distinguished from other noise sources.

When the STS 100 is in lock-down mode, sensors at the trailer door, motion/heat sensors within the trailer 20, and/or the like may be activated to continuously or periodically monitor the opened/closed state of the door, the presence or motion of a body within the trailer, and/or the like. If, for example, it is detected that the doors have been forced open, or that a person has somehow entered the interior of the trailer, the master controller 104 may send an alert to the user (e.g., to the user's mobile device 50), the fleet monitoring server 30, and/or a security center indicating that the trailer security has been breached and prompt them to contact law enforcement about the potential theft in progress. Once a breach of the trailer 20 has been detected, the STS 100 then begins to monitor its location and continuously or periodically broadcasts its location (e.g., GPS coordinates) to the user device 50/server 30/security center so that the trailer 20 may be tracked down (by, e.g., law enforcement). Additionally, once the motion/heat sensors within the trailer have been triggered, the master controller 104 may activate one or more cameras in the trailer to record images and/or video of the individuals who have broken into the trailer 20. Such images/videos may also be broadcast to the user device 50/server 30/security center, which may aid in identifying the perpetrators.

In some examples, the PMU 128 may ensure that the STS 100 has sufficient power to perform the above-described operations even when the trailer 20 has been electrically separated from the tractor 10 for an extended period of time (e.g., weeks or months).

Figure 8:
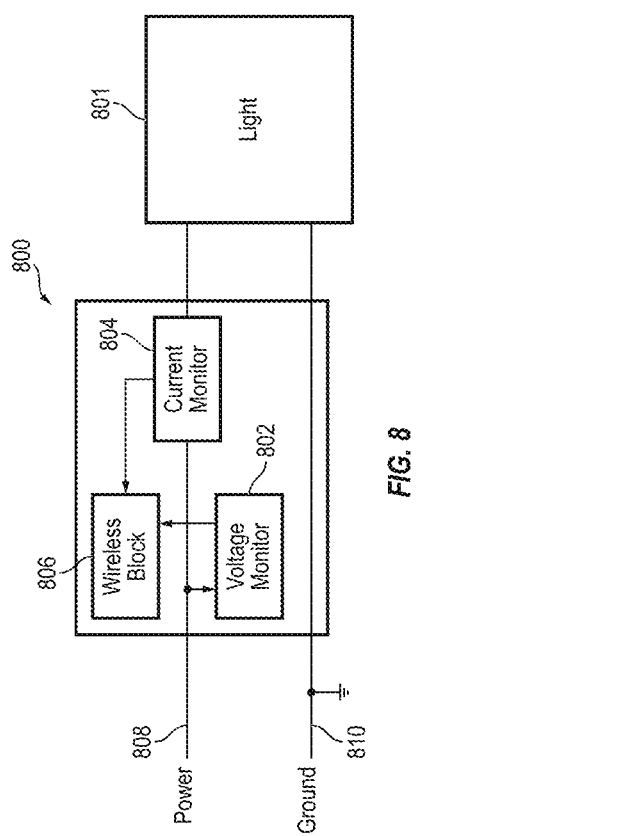
FIGS. 8 and 9 illustrate a smart wireless sensor module, according to some embodiments of the invention.
Figure 9:
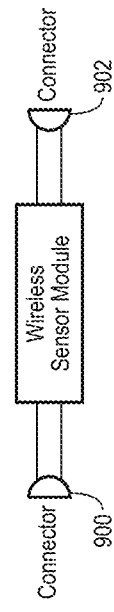
Figure 10B:
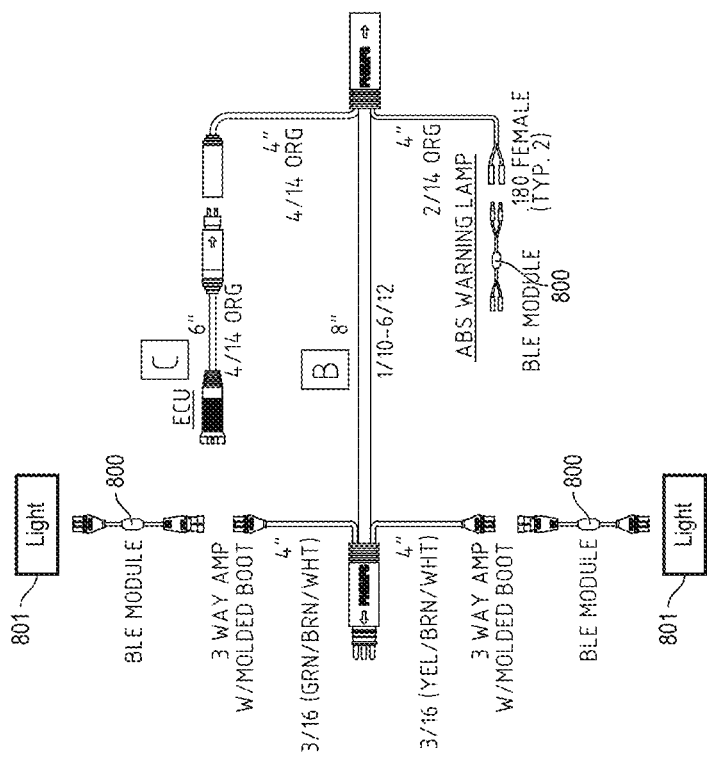
Figure 10C:
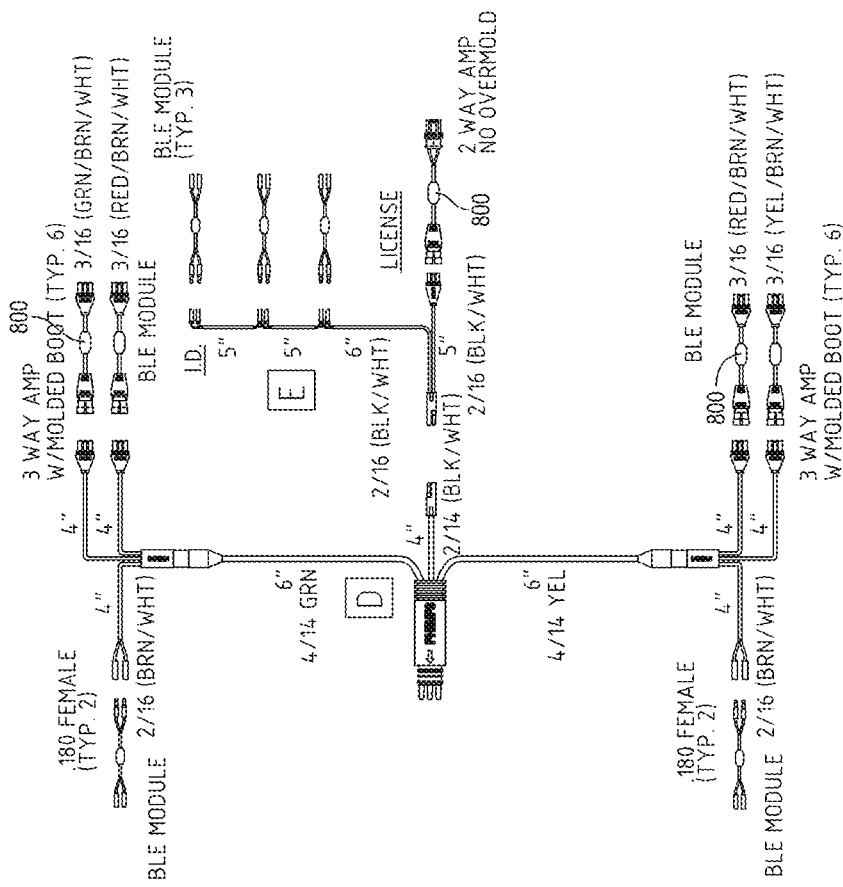

FIGS. 8-9 illustrate a smart wireless sensor module 800, according to some embodiments of the invention. FIGS. 10A-10C illustrate several connector configurations of the smart wireless sensor module, according to some exemplary embodiments of the present invention.

Aspects of some embodiments of the invention are directed to a smart wireless sensor module (hereinafter referred to as a "wireless sensor module") electrically coupled to a light (e.g., a trailer light) 801 and capable of monitoring the condition of the light 801 and wirelessly transmitting status information indicative of the light condition to the master controller 104.

As illustrated in FIG. 8, in some embodiments, the wireless sensor module 800 includes a voltage monitor 802 for monitoring (e.g., sensing/measuring) the voltage at the input of the light 801, and a current monitor 804 for monitoring (e.g., sensing/measuring) the light's current draw. In some examples, the voltage monitor 802 includes any suitable voltage sensor, such as one using a resistor divider or a resistance bridge, or the like. In some examples, the current monitor 804 may include any suitable current sensor, such as a Hall effect sensor, a fluxgate transformer, a resistor-based sensor, or the like. While not shown in some examples, the wireless sensor module 800 may include a temperature sensor for monitoring the light temperature. Once data is collected, the wireless sensor module 800 then wirelessly communicates, via the wireless block 806, the collected information to the master controller 104 or an associated SIB 110. The wireless sensor module 800 may collect said data continuously or periodically (e.g., every 5 seconds).

In a trailer with many lights 801, each light 801 may have its own dedicated wireless sensor module 800. Using the information provided by the individual wireless sensor modules 800, the master controller 104 can identify a specific light that has failed (e.g., is broken). This is in contrast to other systems of the related art, which can only detect failures at a circuit level, which may at best narrow the failure to a group of lights, and not a specific light.

At any given time, the master controller 104 may be aware of the on/off state (or the intended on/off state) of each light 801 within the trailer 20. In some examples, the central processor may detect failure when a wireless sensor module 800 corresponding to a light 801 that is supposed to be on indicates that the light has voltage at its input (e.g., the voltage of the corresponding power line 808 is above a certain threshold) but there is no current draw (e.g., the current through the corresponding power line 808 is zero, substantially zero, or below a minimum threshold). Additionally, if the sensed current is above a maximum threshold, the master controller 104 may determine that the light 801 is experiencing a failure and turn off the light 801 (by, e.g., removing power from the power line 808).

While the smart trailer system may continuously monitor the state of each light 801, the STS 100 may also perform a diagnostic or self-check action, for example, during system initialization (e.g., when the tractor is turned on). In the diagnostic mode, the master controller 104 may attempt to turn on every light 801 and collect data voltage and current information from each light 801 via the corresponding wireless sensor modules 800. Any detected failures may then be reported to the user device 50, the server 30, and/or the operator device 31.

In some embodiments, the STS 100, which includes the master controller 104, may notify the fleet dispatch (e.g., through the server 30) and/or the driver (e.g., though a console at the trailer or the driver's mobile device 50) that a light 801 has failed and point them to the closest distributor for replacement. Dispatch or the driver may then call the distributor in advance to confirm that the part is in stock.

The wireless sensor module 800 (e.g., the wireless block 806) may employ any suitable wireless protocol, such as Bluetooth® (e.g., Bluetooth Low Energy (BLE)), to transmit information to the central processor and, in some embodiments, to receive commands from the central processor. To extend the range of Bluetooth® communication, in some embodiments, mesh network technology, such as Bluetooth® 5, Zigbee®, or the like, may be employed. In such embodiments, each wireless sensor module 800 acts as a mesh node that relays information to one or more other mesh nodes within its range until the information reaches its intended target (e.g., the master controller 104). As a result, in such embodiments, a wireless sensor module 800 attached to a light at the back of a trailer may easily communicate with a master controller 104 at or near the front of a trailer 20 or at the tractor 10. During initial setup, the mesh network may be established/defined in accordance with each trailer's unique profile.

In some embodiments, the wireless sensor module 800 is configured to be serially connected to the light 801 (i.e., to be in-line with, or in the current path of, the light). In some examples, the input and output connectors of the wireless sensor module 800 may have 2 ports/pins 808 and 810 for electrically conducting a power signal and a ground signal, respectively. This allows the electrical power from a harness/electrical cable to pass through to the light 801 itself.

As illustrated in FIG. 9, the wireless sensor module 800 may be in the form of a jumper cable with an input connector 900 configured to mate with (e.g., both physically and electrically) an output connector of a harness and have an output connector 902 configured to mate with the input connector of the light 801. For example, the input and output connectors 900 and 902 may be male and female bullet/push connectors, respectively. FIGS. 10A-10C illustrate several connector configuration examples for the wireless sensor module 800.

According to some embodiments, the wireless sensor module 800 is powered off of the power line 808 and may not rely on battery power; however, embodiments of the present invention are not limited thereto. For example, the wireless sensor module 800 may include a local battery (e.g., a replaceable and/or rechargeable battery) that powers its internal operation.

The information gathered by the STS 100 may enable a number of functions that otherwise may not be feasible. In some examples, if the road temperature is high (e.g., about 140 degrees Fahrenheit), the tires of the trailer 20 may be inflated or deflated (e.g., while in motion) so that the right PSI in the tire(s) is met to achieve maximum mileage and fuel efficiency. If the trailer is moving, the interior lights may be automatically shut off and the liftgate may be retracted so as to not cause injury or other damage. In some examples, a Bluetooth Low Energy (BLE) device or RFID may be able to communicate with customer dock doors and entrance/exit gates to determine when the trailer is coming or going or which dock it is at. The "home-office" can then better plan its loading and unloading with automated services instead of relying on human interaction.

According to some embodiments, multiple modules of the STS 100 may be packaged in a single housing so as to reduce the overall size of the system that is inside the trailer 20. This may increase the amount of room for cargo as well as reduce the need to run additional wires throughout the trailer.

The STS 100 may transmit (e.g., in real time) the data collected from the sensors to the server 30, the end user device 50, and/or the operator device 31 or any receiving device using telematics, even when the trailer is in motion.

When the STS 100 is out of cellular range, the system may continue to log events with timestamps, such that when the trailer 20 is back in cellular range, the information may be sent to the server 30 along with a record of when the events occurred.

When the STS 100 is powered off of the backup battery 129 (e.g., when the tractor is off and there is insufficient power from the auxiliary power sources 140), the STS 100 may turn off one or more (e.g., all) of the trailer sensors in order to conserve power and reduce or minimize power draw from the battery at the trailer.

According to some examples, the master controller 10 may be located at the front of the trailer 20 (which faces the tractor 10) and may communicate the sensed data to the operator at the tractor 10 through a wired cable or a wireless transceiver 135. The wireless transceiver 135 may also allow the master controller 104 to communicate with dispatch (e.g., a central station) through the server 30, allowing dispatch to monitor the state of each of the transportation vehicles in its fleet.

As will be appreciated by a person of ordinary skill in the art, while the above description of the STS 100 has been described with respect to a transportation vehicle, embodiments of the present invention are not limited thereto and may be implemented in any suitable arena.

Examples of Data Aggregation and Interpretation for Alert, Diagnostic and Informational Purposes Using the Phillips Connect Technologies Smart Trailer System and its Related Components.

Recommended Speed Limit

A recommended speed limit can be derived from sensor data so as to maximize safety, increase the life of parts or components, and to decrease or eliminate speed-related and/or speed-exacerbated traffic incidents and component failures.

Communicated to driver via mobile app
Derived from the following Sensor Data:
Wheel Speed
Axle Weight (trailer weight)
Accelerometer Input (potentially from various onboard sources)
Road Incline (pitch)
Trailer body orientation (roll)
Trailer body direction (yaw)
Brake Adjustment Level
% remaining
If the remaining wear percent is below a predetermined threshold, the system calculates a lower speed limit to ensure that less braking is required.
Brake Temperature
If the brakes are above a predetermined threshold or are approaching said threshold, the system calculates a lower speed limit to ensure that less braking is required.
Wheel End Temperature
Brake Adjustment Level (Drum Brakes)
Measures brake stroke via push rod movement
Outputs distance traveled by push rod
Percent remaining until brake adjustment is necessary can be derived
See "Estimated Miles Remaining Until Brake Adjustment Due"
Excessive braking can be derived based on amount of wear over time
Accelerometer data can augment the ability to determine brake use
Estimated Miles Remaining Until Brake Adjustment Due
Once Brake Adjustment Level reaches a predetermined threshold (e.g., <10%), an estimate of driving miles remaining until the trailer will require brake adjustment is calculated based on the average amount of brake wear over time from one of the below sources:
Derived from PCT historical brake wear data in city and rural environments
This historical usage average can be stored locally on the trailer's onboard computer or in cloud-based servers which send this information to the onboard computer as needed
Data can be presented in a dual format ("City" and "Rural" estimated miles remaining)
Calculated by the driver's brake usage and braking habits over a predetermined distance (e.g., 10 miles, 100 miles, etc.) on a given trip
Estimate can be continuously updated over the length of the trip
Brake usage is calculated using the following inputs:
Brake Adjustment Level
Wheel Speed (vehicle speed)
Real time
Average over time
Axle weight (trailer weight)
Odometer
Accelerometer (from the onboard computer or multiple onboard sources)
Acceleration and deceleration rates (speed over time)
Data is averaged and smoothed over time by the onboard computer
g-Force of acceleration and deceleration events
Road Incline (pitch)
Trailer body orientation (roll)
Trailer body direction (yaw)
Integrated Automatic Tire Inflation/Deflation System Presently, systems exist to adjust trailer tire air pressure either through inflation or deflation, but not both. Although this narrative describes both functions, the assumption should be made that either an inflation-capable system or a deflation-capable system is installed.

By reading multiple sensor inputs to determine environmental and road conditions, tire air pressure can be automatically adjusted (increased/decreased) to provide maximum efficiency, tire wear life, and overall safety.

Tire air pressure requirement is determined using the following data:
Axle weight (trailer weight)
Ambient temperature
Wheel end temperature
Wheel speed (vehicle speed)
Premature Trailer Movement Detection Premature trailer movement is an undesirable, damaging, and preventable operator-induced condition that results in damage ranging from tire drag to potentially catastrophic events such as wheel end fires. This condition occurs when a tractor connected to a trailer (via fifth wheel, pintle hook, dolly, etc.) is placed into gear and begins to move/drive before the trailer's air brake system has reached the minimum required air pressure to disengage the emergency air brake.

Although the emergency brake knob may be set to the "disengage" position within the cab, the trailer's wheels remain locked by the emergency brake.

This condition can lead to damaged tires, which subsequently can damage wheel, axle, suspension, and various other components and systems and, in extreme cases, can cause fires and catastrophic trailer damage.

In order to determine when a premature trailer movement event occurs, the following data will be used:

Air pressure transducer (located in the trailer air brake lock system)

Detects whether air is flowing into the emergency air brake system. Airflow into the system indicates that the emergency brake has been released in the cab.

Measures air brake system PSI
Accelerometer (onboard computer)
g-Force measurement
Directional travel (to determine amount of movement)
Time-based measurement will identify how long the trailer was dragged before the brakes disengaged.
Wheel speed Little to no movement of the wheels in combination with directional accelerometer readings is highly indicative of tire drag—a condition directly arising from premature movement.

Accelerometer(s) (located on/near axle/wheel end)

Data used to determine a significant change in vibration, indicative of tire(s) having developed a flat or uneven spot due to tire drag Wheel End Failure Early Detection/Warning Wheel end failure is often a catastrophic condition that can result in extensive damage to vehicles and even the loss of life. This feature will detect various potential symptoms that may lead to wheel end failure. Some of these symptoms include Brake Drum Overheat, Wheel Bearing Failure, and Low Bearing Oil Level.

When a condition is sensed that could be a trigger for or sign of impending wheel end failure, an alert will be generated and sent to both the dispatch-level user and trailer operator-level user (driver).

Some of the sensor input used to determine potential wheel end failure include:

Accelerometer(s)—Systemwide
Road Incline (pitch)
Trailer body orientation (roll)
Trailer body direction (yaw)
Accelerometers(s)—Local
Excessive vibration
Wheel End
Brake Drum
Axle Bearings Data used to determine if vibration is indicative of an imminent failure condition Bearing Oil Level
Ambient Temperature
Localized Temperature(s)
Wheel End Temperature
Wheel Speed (vehicle speed)
Brake Adjustment Level % remaining
Partner vendor sensors specifically made to measure and calculate wheel end information Flat/Damaged Tire Detection In order to determine whether one or more trailer tires are not properly inflated (due to damage, wear, etc.) or are unable to maintain inflation pressure, this system will use the following combination of inputs:

Accelerometer(s)—Systemwide
Road Incline (pitch)
Trailer body orientation (roll)
Trailer body direction (yaw)
Excessive, continued vibration
Accelerometers(s)—Local
Excessive vibration
Wheel End
Axle
Body
Tire Air Pressure
Integrated Automatic Tire Inflation/Deflation System
To measure determine if tire is unable to maintain proper PSI Phillips Connect Technologies Trailer Air Brake Locking System (ABLS) Function and System Logic System Description The Air Brake Locking System (ABLS) is a device that is placed directly in line with the incoming airflow into a trailer's emergency air brake system.

This device monitors the absence or presence of incoming air pressure using an air pressure transducer and manually blocks/unblocks the flow of air into the emergency air brake system through the use of an electrically controlled solenoid valve.

Activation and Deactivation of the ABLS is controlled digitally via any of the following:

Web Portal
Smart Device App
Keypad (installed locally on trailer)

The trailer's air brakes are physically locked and unlocked by the ABLS when certain conditions exist, to be described in detail within this document.

Relevant Definitions

ACTIVATION—As it relates to the ABLS, is the process of engaging the ABLS digitally (and subsequently mechanically), through use of either a web-based portal, a mobile device-based application, or the local keypad on the trailer (if installed).

Activation function may ONLY be accessed and sequence completed by users who have been given digital permissions to control said feature by a higher level authority, as determined by the owner or operator of the trailer which contains the ABLS being activated.

DEACTIVATION—As it relates to the ABLS, deactivation is the process of disengaging the ABLS digitally (and then mechanically), through use of either a web-based portal, a mobile device-based application, or the local keypad on the trailer (if installed).

Deactivation function may be accessed and sequence completed only by users who have been given digital permissions to control said feature by a higher level authority, as determined by the owner or operator of the trailer which contains the ABLS being deactivated.

PARKED—the static state of being of a trailer resulting from the simultaneous and persistent presence of the following conditions:

Parking brake is activated.

The parking brake is engaged automatically when air is removed from the emergency air brake system. Under normal operating conditions, this typically results from the following actions:

By setting the emergency brake knob in the cab of a tractor

By disconnecting the emergency air brake system gladhand

This condition may be monitored through the use of a pressure transducer placed in line with airflow into the emergency air brake system to detect the presence or absence of incoming air in the emergency brake system.

Trailer is not moving (wheels are static).

This condition may be monitored and derived through the use of wheel speed sensor data or accelerometer-based data, or a combination of the two.

Electrical connection via SAE J560 is not present.

This condition may be monitored via implementation of a device that senses and communicates the presence or absence of incoming voltage at the trailer's SAE J560 ("7-way") electrical connection socket.

Additional Information

In order to minimize the electrical power profile and consumption requirements of the ABLS, the ABLS does not supply electrical current to the solenoid and does not monitor the air pressure coming into the emergency brake system when the system is deactivated (unlocked state).

In order to minimize the electrical power profile and consumption requirements of the ABLS when the system has been activated (locked state), the ABLS is designed to act primarily as a monitoring system and secondarily as a physical locking system (active engagement).

MONITORING STATE: In its monitoring state, the ABLS periodically checks for changes in the air pressure coming into the trailer's emergency air brake system and the ABLS solenoid remains physically disengaged.

ACTIVE ENGAGEMENT STATE: In the active engagement state, the ABLS actively monitors the air pressure coming into the trailer's emergency air brake system and applies continuous current to the solenoid to actively "lock" the trailer in place by preventing the disengagement of the trailer's emergency brakes.

A digitally activated ABLS changes state from the monitoring state to the actively engaged state when any single or combination of the following conditions exists:

ABLS senses incoming air pressure change greater than 10 PSI

Electrical current is present at the SAE J560 electrical connection

Wheel movement is sensed

Accelerometer(s) sense(s) threshold acceleration and/or g-shock

The present invention is not to be limited in scope by the specific embodiments described herein. Indeed, other various embodiments of and modifications to the present invention, in addition to those described herein, may be apparent to those of ordinary skill in the art from the foregoing description and accompanying drawings. Thus, such other embodiments and modifications are intended to fall within the scope of the present invention. Further, although the present invention has been described herein in the context of a particular implementation in a particular environment for a particular purpose, those of ordinary skill in the art may recognize that its usefulness is not limited thereto and that the present invention may be beneficially implemented in any number of environments for any number of purposes. Accordingly, the claims set forth below should be construed in view of the full breadth and spirit of the present invention as described herein and equivalents thereof.

The smart trailer and/or any other relevant devices or components according to embodiments of the present invention described herein may be implemented utilizing any suitable hardware, firmware (e.g., an application-specific integrated circuit), software, or a suitable combination of software, firmware, and hardware. For example, the various components of the smart trailer may be formed on one integrated circuit (IC) chip or on separate IC chips. Further, the various components of the smart trailer may be implemented on a flexible printed circuit film, a tape carrier package (TCP), a printed circuit board (PCB), or formed on a same substrate. Further, the various components of the smart trailer may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

What is claimed is:

1. A smart trailer system coupled to a trailer of a vehicle, the smart trailer system comprising:
    a sensor coupled to the trailer and configured to measure a parameter of the trailer;
    a sensor interface board (SIB) electrically coupled to the sensor and configured to control the sensor and to generate sensed data based on the measured parameter; and
    a controller communicatively coupled to the SIB via a data bus, and configured to aggregate the sensed data,
    wherein the controller is further configured to perform a diagnostic operation by identifying a status of each of components of the controller, the sensor, and the SIB, and to transmit status data corresponding to status of each of the components of the controller, the sensor, and the SIB to a remote server,
    wherein the controller is configured to perform the diagnostic operation in response to receiving an external command.

2. The smart trailer system of claim 1, wherein the parameter comprises one or more of speed, acceleration, temperature, interior humidity, vibration, interior light level.

3. The smart trailer system of claim 1, wherein the sensor is configured to periodically measure the parameter at a sensing rate,
    wherein the controller is configured to receive sensory data corresponding to the periodically measured parameter from the SIB, and to transmit the sensory data at a transmission rate,
    wherein the controller is further configured to determine the sensing rate and the transmission rate, and
    wherein determining the transmission rate is based on a power state of the smart trailer system, the power state comprising: idle mode, sleep mode, and normal operation mode.

4. The smart trailer system of claim 1,
wherein the controller is further configured to perform the diagnostic operation in response to electrical power being applied to the controller.

5. The smart trailer system of claim 1, wherein the controller comprises:
a bus transceiver electrically coupled to the data bus, and configured to facilitate communication with the SIB via the data bus;
a memory device configured to store the aggregated sensed data;
a cellular modem configured to wirelessly communicate the aggregated sensed data to a remote server; and
a processor for managing operations of the bus transceiver, the memory device and the cellular modem.

6. The smart trailer system of claim 1, wherein the SIB comprises:
a SIB controller configured to manage operations of the SIB and to facilitate communication between the controller and the sensor;
a SIB power manager configured to convert a system voltage received from the controller into operating voltages for the SIB and into voltages utilized by the sensor; and
a serial interface configured to facilitate communication with the controller via the data bus and to support serial data communication with the sensor.

7. The smart trailer system of claim 1, further comprising:
a fleet management server in communication with the controller, the fleet management server being configured to selectively determine or more of:
a set of alerts and trailer data that the controller is permitted to transmit directly to an authorized user via a wifi transceiver of the controller;
a set of controls and features that the authorized user is permitted to access locally via a mobile application on a mobile device of the authorized user;
a set of controls and features that the controller may perform autonomously when a cellular modem of the controller does not have a connection to the fleet managing server; and
an acceptable geographic boundary for a location of the trailer.

8. The smart trailer system of claim 7, wherein the fleet management server is further configured to provide telematics and status information received from the controller to an operator device for display to an administrator, and
wherein the telematics and status information comprises one or more of a geographic location of the trailer, a speed of the trailer, a route history of the trailer, a tire pressure of a tire of the trailer, brake status of the trailer, cargo temperature of the trailer, and lock/unlock status of the trailer.

9. The smart trailer system of claim 7, wherein the fleet management server is further configured to send, upon an invocation received from an operator device, a command signal to the controller to initiate a self-test, to initiate capture and transmission of all sensor data, to initiate activation or release of a door lock, or to initiate activation or release of an air lock.

10. The smart trailer system of claim 7, wherein the fleet management server is further configured to:
analyze information received from the controller; and
generate, based on the analyzed information, one or more alerts comprising one or more of:
a break-in alert, when the controller indicates a door open status;
an unauthorized tractor alert, when the controller detects an airline and/or a 7-way connector connection and a proper authorization code is not received by the controller;
a stolen trailer alert, when air lock is engaged and the controller detects trailer motion;
a brake tamper alert, when the air lock is bypassed or a cable to the air lock from the controller is cut;
a tire pressure alert, when a tire pressure is outside of a pressure range;
a brake lining alert, when the controller indicates that a brake lining is outside of a lining range;
a hub fault alert, when the controller indicates that hub conditions are outside of a hub range;
a SIB fault self-test alert, when the controller indicates a SIB fault after performing a self-test on the SIB;
a sensor fault alert, when the controller indicates a sensor fault after performing a self-test on the sensor;
a data bus fault alert, when the controller indicates a data bus fault after performing a self-test of the data bus;
a controller fault alert, when the controller indicates a controller fault after performing a self-test of the controller;
a wifi fault alert, when the controller indicates a wifi fault after performing a self-test of a wifi controller;
an excessive speed alert, when a speed of the trailer is above a legal speed limit by a pre-determined percentage; and
a hazardous driving alert, when a G-force of the trailer is above a G-force level.

11. The smart trailer system of claim 10, wherein the fleet management server is further configured to:
receive authentication code from a mobile application on an end user device;
identify an authorized access level based on the authentication code; and
provide trailer information to the mobile application based on the identified authorized access level, the trailer information comprises one or more of historical data stored in a local memory of the controller and an alert.

12. The smart trailer system of claim 1, further comprising:
a power management unit comprising:
a plurality of auxiliary power sources coupled to the vehicle;
a battery at the trailer; and
a power regulator configured to receive power from the plurality of auxiliary power sources, and to regulate the power for supply to the battery, a plurality of auxiliary devices at the vehicle, and the smart trailer system.

13. The smart trailer system of claim 12, wherein the power management unit is configured to:
monitor a power usage of each of the plurality of auxiliary devices at the trailer to determine a total power consumption of the plurality of auxiliary devices;
compare the total power consumption of the plurality of auxiliary devices with the regulated power; and
in response to determining that the regulated power is greater than the total power consumption of the plurality of auxiliary devices by an excess power, route the excess power to the battery.

14. The smart trailer system of claim 13, wherein the power management unit is configured to:
   determine a charge level of the battery; and
   in response to determining that the battery is fully charged, route the excess power to a tractor of the vehicle via a dedicated power connection coupling electrical systems of the tractor and the trailer.

15. The smart trailer system of claim 1, further comprising a battery,
   wherein the controller is configured to electrically power the sensor and the SIB via the battery during the diagnostic operation.

16. A smart trailer system coupled to a trailer of a vehicle, the smart trailer system comprising:
   a sensor coupled to the trailer and configured to measure a parameter of the trailer;
   a sensor interface board (SIB) electrically coupled to the sensor and configured to control the sensor and to generate sensed data based on the measured parameter; and
   a controller communicatively coupled to the SIB via a data bus, and configured to aggregate the sensed data,
   wherein the controller is further configured to perform an operation in response to a command received from a remote server,
   wherein the operation comprises resetting the controller or the smart trailer system, initiating diagnostic operation, initiating software and/or firmware update of the smart trailer system, transmitting data to the remote server, or setting security features of the smart trailer system, and
   wherein the data comprises at least one of status data, sensor measurement data, location, and telematics data.

17. The smart trailer system of claim 1, further comprising:
   a wireless controller configured to enable communication between the controller and a user device; and
   a bluetooth transceiver configured to enable communication between the controller and a wireless sensor coupled to the trailer.

18. A smart trailer system coupled to a trailer of a vehicle, the smart trailer system comprising:
   a sensor coupled to the trailer and configured to measure a parameter of the trailer;
   a sensor interface board (SIB) electrically coupled to the sensor and configured to control the sensor and to generate sensed data based on the measured parameter; and
   a controller communicatively coupled to the SIB via a data bus, and configured to aggregate the sensed data,
   wherein the SIB is further configured to operate in idle mode to suspend operation of the sensor in between periodic measurements of the parameter, and
   wherein, in response to a command from the controller, the SIB is further configured to operate in sleep mode to place circuits of the SIB and the sensor in corresponding lowest power modes.

19. A smart trailer system coupled to a trailer of a vehicle, the smart trailer system comprising:
   a sensor coupled to the trailer and configured to measure a parameter of the trailer;
   a sensor interface board (SIB) electrically coupled to the sensor and configured to control the sensor and to generate sensed data based on the measured parameter;
   a controller communicatively coupled to the SIB via a data bus, and configured to aggregate the sensed data; and
   an actuator configured to produce a mechanical motion in response to a control signal,
   wherein the SIB is electrically coupled to the actuator and is further configured to control the actuator by generating the control signal based on a command received from the controller.

20. The smart trailer system of claim 19, wherein the actuator is an air brake actuator configured to engage and disengage an airline to an emergency brake system of the trailer.

21. A smart trailer system coupled to a trailer of a vehicle, the smart trailer system comprising:
   an air brake lock system comprising:
      a pressure sensor configured to monitor an air pressure of a brake system of the trailer; and
      an air brake actuator configured to selectively engage and disengage an air line to the brake system; and
   a controller communicatively coupled to the pressure sensor and the air brake actuator and configured to determine motion of the trailer based on speed data from a remote server and/or speed data received from an accelerometer sensor in the trailer,
   wherein, in response to determining motion of the trailer, the controller is configured to disengage the air brake lock system.

* * * * *